United States Patent
Murakami

(10) Patent No.: US 11,029,232 B2
(45) Date of Patent: Jun. 8, 2021

(54) OPTICAL TIME DOMAIN REFLECTOMETER AND TESTING METHOD OF OPTICAL TIME DOMAIN REFLECTOMETER

(71) Applicant: ANRITSU CORPORATION, Kanagawa (JP)

(72) Inventor: Taichi Murakami, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 31 days.

(21) Appl. No.: 16/747,888

(22) Filed: Jan. 21, 2020

(65) Prior Publication Data

US 2020/0240872 A1 Jul. 30, 2020

(30) Foreign Application Priority Data

Jan. 25, 2019 (JP) .............................. JP2019-010799

(51) Int. Cl.
*G01M 11/00* (2006.01)
(52) U.S. Cl.
CPC ............................... *G01M 11/3145* (2013.01)
(58) Field of Classification Search
CPC ................................................. G01M 11/3145
See application file for complete search history.

(56) References Cited

U.S. PATENT DOCUMENTS 6,519,026 B1 * 2/2003 Holland ............. G01M 11/3109
356/73.1

FOREIGN PATENT DOCUMENTS

JP 2012-008076 A 1/2012

* cited by examiner

*Primary Examiner* — Hina F Ayub
(74) *Attorney, Agent, or Firm* — Pearne & Gordon LLP

(57) ABSTRACT

An optical time domain reflectometer includes: a storage unit that stores in advance a fourth backscattered light level $P_Z(W_2)$ obtained by adding a difference $\Delta P_R$ between a second backscattered light level $P_R(W_1)$ which is measured using a first pulse width $W_1$ and a third backscattered light level $P_R(W_2)$ which is measured using a second pulse width $W_2$ to a first backscattered light level $P_Z(W_1)$ at a connection point $D_D$ to a measurement target optical fiber which is measured using the first pulse width so as to be associated with the second pulse width; and an arithmetic processing unit that reads the fourth backscattered light level $P_Z(W_2)$ at the second pulse width corresponding to a pulse width of an optical pulse output from a light source to the measurement target optical fiber from the storage unit and calculates a transmission loss $L_T$ in the measurement target optical fiber.

6 Claims, 4 Drawing Sheets

OPTICAL TIME DOMAIN REFLECTOMETER AND TESTING METHOD OF OPTICAL TIME DOMAIN REFLECTOMETER

TECHNICAL FIELD

The present disclosure relates to an optical time domain reflectometer (OTDR) and a testing method that is performed by OTDR.

BACKGROUND ART

OTDR measurement is performed in order to measure, for example, the loss of an optical transmission line. In the OTDR measurement, an optical pulse from a light source is output to a measurement target optical fiber and the power of backscattered light in the measurement target optical fiber is measured. The optical pulse from the light source is output to the measurement target optical fiber through a connection port connected to a dummy fiber in a device. In general, the total loss of the measurement target optical fiber connected to an OTDR is calculated using the sum of a difference between the power level of backscattered light at a near end (a connection point to the outside of the device) of the OTDR and the power level of backscattered light at the end of the measurement target optical fiber and loss at the connection port. It is important to accurately measure these values since the OTDR determines whether a failure occurs on the basis of the calculation result of the total loss.

However, in order to measure the loss at the connection port, the backscattered light power of the dummy fiber and the backscattered light power at the near end of the OTDR need to be measured and spatial resolution that can distinguish the dummy fiber from the measurement target optical fiber is required. In addition, the pulse width PW used by the OTDR inevitably needs to satisfy the following expression:

[Expression 1]

$$PW \leq 2L\frac{n_g}{C} \ [s] \quad (1)$$

where L is the length of a fiber, ng is a group refractive index of the fiber, and C is the speed of light.

For example, in a case in which the dummy fiber has a length L of 10 m and a group refractive index of 1.5, the pulse width is 100 ns or less, which is a requirement for measuring the loss at the connection port.

In a case in which the length of the measurement target optical fiber is long, the measurement target optical fiber includes a splitter, or the loss to the end of the measurement target optical fiber is large, the pulse width needs to be widened in order to measure the total loss. In a case in which the pulse width is widened, it is difficult to measure the total loss including the loss at the connection port.

As means for solving this problem, means using a long dummy fiber is simple. However, for example, in a case in which a pulse width of 10 μs is used, a dummy fiber with a length of 1 km is required, which causes an increase in the size of the device or an increase in cost.

In addition, a method has been proposed which measures the optical power level of the backscattered light of a dummy fiber using a short pulse width for the dummy fiber in one measurement operation and then measures loss in a connection port using a long pulse width that can be used to measure loss up to the end of a measurement target optical fiber (for example, see Patent Document 1). However, the method disclosed in Patent Document 1 has a problem that the measurement time increases since two or more pulse widths are used for one measurement operation.

RELATED ART DOCUMENT

Patent Document

[Patent Document 1] JP-A-2012-8076

DISCLOSURE OF THE INVENTION

Problem That the Invention is to Solve

An object of the present disclosure is to provide an optical time domain reflectometer that can measure the total loss including loss in a connection port of a measurement target optical fiber, without performing measurement using a plurality of pulse widths, even in a case in which the length of a dummy fiber is so short that it is not distinguished from a pulse width output to the measurement target optical fiber in terms of spatial resolution.

Means for Solving the Problem

According to a first aspect of the present disclosure, there is provided an optical time domain reflectometer including: a pulse width setting unit that sets a pulse width of an optical pulse; a light source that generates an optical pulse with the pulse width set by the pulse width setting unit; an optical receiver that detects a backscattered light level obtained by scattering of the optical pulse output from the light source in a measurement target optical fiber; a storage unit that stores in advance a fourth backscattered light level ($P_Z(W_2)$) obtained by adding a difference ($\Delta P_R$) between a second backscattered light level ($P_R(W_1)$) at a predetermined reference distance ($D_R$) which is measured using a predetermined first pulse width ($W_1$) and a third backscattered light level ($P_R(W_2)$) at the predetermined reference distance ($D_R$) which is measured using a second pulse width ($W_2$) larger than the first pulse width to a first backscattered light level ($P_Z(W_1)$) at a connection point ($D_D$) to the measurement target optical fiber to be connected which is measured using the first pulse width so as to be associated with the second pulse width before a test; and an arithmetic processing unit that reads the fourth backscattered light level ($P_Z(W_2)$) at the second pulse width corresponding to a pulse width of an optical pulse output from the light source to the measurement target optical fiber for the test from the storage unit and calculates a transmission loss ($L_T$) in the measurement target optical fiber using the fourth backscattered light level ($P_Z(W_2)$).

According to a second aspect of the present disclosure, in the optical time domain reflectometer according to the first aspect, the storage unit may store in advance the difference ($\Delta P_R$) and the first backscattered light level ($P_Z(W_1)$) so as to be associated with the third pulse width before the test, instead of the fourth backscattered light level ($P_Z(W_2)$), and the arithmetic processing unit may read the difference ($\Delta P_R$) and the first backscattered light level ($P_Z(W_1)$) from the storage unit, add the difference ($\Delta P_R$) and the first backscattered light level ($P_Z(W_1)$), and calculate the transmission loss ($L_T$) in the measurement target optical fiber using the calculated fourth backscattered light level ($P_Z(W_2)$), instead of reading the fourth backscattered light level ($P_Z(W_2)$) from the storage unit and calculating the transmission loss ($L_T$) in the measurement target optical fiber.

According to a third aspect of the present disclosure, in the optical time domain reflectometer according to the first aspect, the storage unit may further store a predicted range of a backscattered light level at the reference distance and the arithmetic processing unit may determine whether or not a backscattered light level at the reference distance detected by the optical receiver is out of the predicted range to further detect connection abnormality at the connection point to the measurement target optical fiber.

According to a fourth aspect of the present disclosure, in the optical time domain reflectometer according to the second aspect, the storage unit may further store a predicted range of a backscattered light level at the reference distance and the arithmetic processing unit may determine whether or not a backscattered light level at the reference distance detected by the optical receiver is out of the predicted range to further detect connection abnormality at the connection point to the measurement target optical fiber.

According to a fifth aspect of the present disclosure, there is provided a testing method of an optical time domain reflectometer. The testing method includes: a storage step of storing in advance a fourth backscattered light level ($P_Z(W_2)$) obtained by adding a difference ($\Delta P_R$) between a second backscattered light level ($P_R(W_1)$) at a predetermined reference distance ($D_R$) which is measured using a predetermined first pulse width ($W_1$) and a third backscattered light level ($P_R(W_2)$) at the predetermined reference distance ($D_R$) which is measured using a second pulse width ($W_2$) larger than the first pulse width to a first backscattered light level ($P_Z(W_1)$) at a connection point ($D_D$) to a measurement target optical fiber to be connected which is measured using the first pulse width so as to be associated with the second pulse width before a test; an optical pulse detection step of generating an optical pulse with a predetermined pulse width for a test, outputting the optical pulse to the measurement target optical fiber, and detecting a backscattered light level of the optical pulse scattered in the measurement target optical fiber; and a transmission loss derivation step of reading the fourth backscattered light level ($P_Z(W_2)$) at the second pulse width corresponding to the predetermined pulse width and calculating a transmission loss ($L_T$) in the measurement target optical fiber using the fourth backscattered light level ($P_Z(W_2)$).

According to a sixth aspect of the present disclosure, in the testing method of an optical time domain reflectometer according to the fifth aspect, in the storage step, the difference ($\Delta P_R$) and the first backscattered light level ($P_Z(W_1)$) may be stored in advance so as to be associated with the second pulse width before the test, instead of the fourth backscattered light level ($P_Z(W_2)$). In the transmission loss derivation step, the difference ($\Delta P_R$) and the first backscattered light level ($P_Z(W_1)$) may be read and added and the transmission loss ($L_T$) in the measurement target optical fiber may be calculated using the calculated fourth backscattered light level ($P_Z(W_2)$), instead of reading the fourth backscattered light level ($P_Z(W_2)$) and calculating the transmission loss ($L_T$) in the measurement target optical fiber.

Advantage of the Invention

According to the present disclosure, the optical time domain reflectometer can measure the total loss including loss at the connection port of the measurement target optical fiber, without performing measurement using a plurality of pulse widths, even in a case in which the length of the dummy fiber is so short that it is not distinguished from the pulse width output to the measurement target optical fiber in terms of spatial resolution.

BEST MODE FOR CARRYING OUT THE INVENTION

Figure 1:
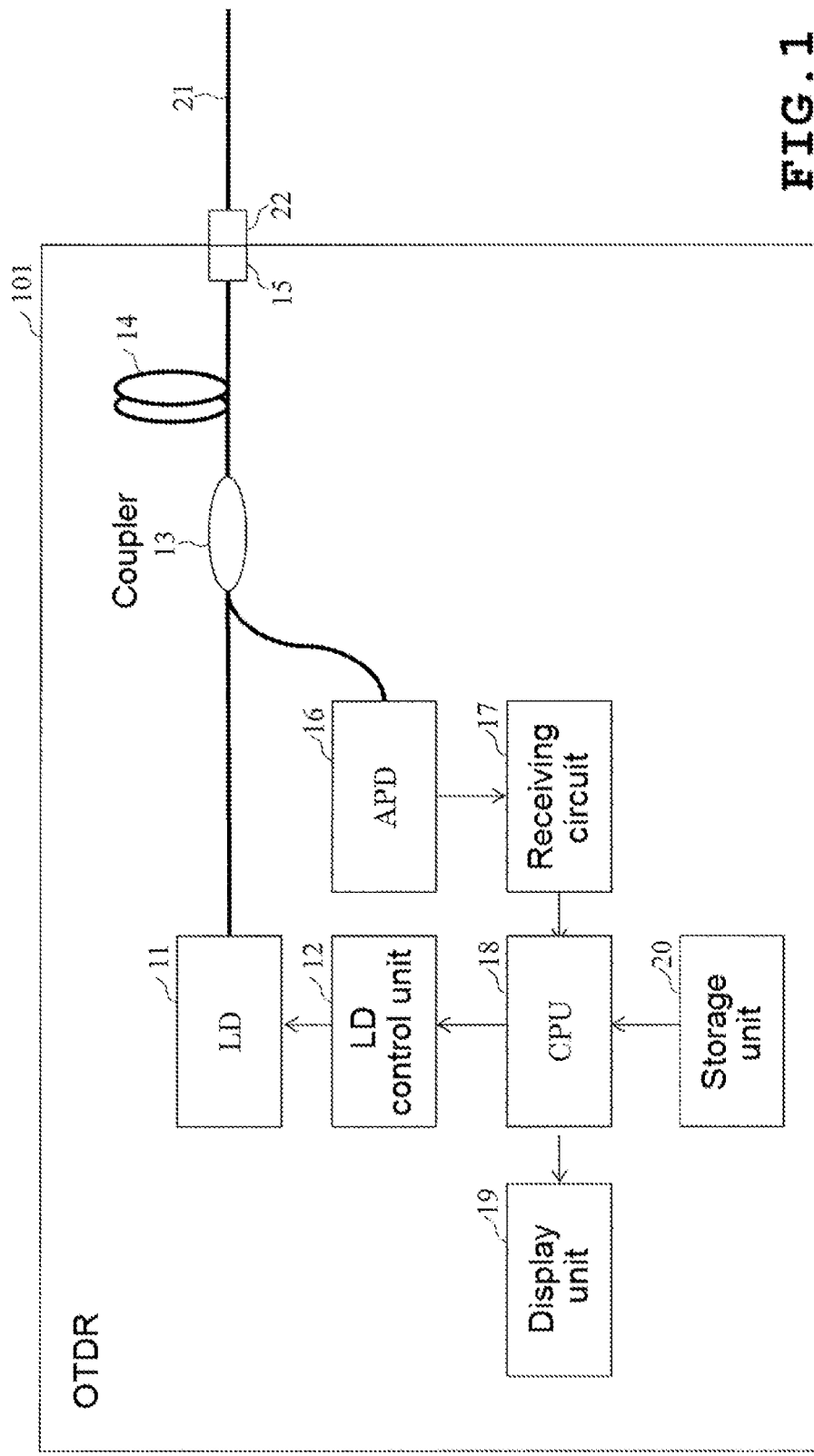
FIG. 1 illustrates an example of the configuration of an optical time domain reflectometer according to the present disclosure.

Hereinafter, an embodiment of the present disclosure will be described in detail with reference to the drawings. The present disclosure is not limited to the following embodiment. The embodiment is just illustrative and various modifications and changes of the present disclosure can be made on the basis of the knowledge of those skilled in the art. In the specification and the drawings, the same components are denoted by the same reference numerals.

FIG. 1 illustrates an example of the configuration of an optical time domain reflectometer according to the present disclosure. An optical time domain reflectometer 101 according to the present disclosure includes a laser diode (LD) 11 that functions as a light source, an LD control unit 12 that functions as a pulse width setting unit, an avalanche photodiode (APD) 16 that functions as an optical receiver, a receiving circuit 17, a central processing unit (CPU) 18 that functions as an arithmetic processing unit, a display unit 19, and a storage unit 20.

The LD 11 and the coupler 13 are connected to each other by an optical fiber, the coupler 13 and a connection port 15 are connected to each other by an optical fiber, and the coupler 13 and the APD 16 are connected to each other by an optical fiber. A dummy fiber 14 is connected between the coupler 13 and the connection port 15. The connection port 15 can be connected to a measurement target optical fiber 21 through a connector 22.

The LD 11 generates an optical pulse for measuring loss in the measurement target optical fiber 21. The LD control unit 12 controls the LD 11 in response to a command from the CPU 18. Any control content may be used. Examples of the control include the turn-on and turn-off of the optical pulse and the pulse width of the optical pulse.

The optical pulse is emitted from the LD 11 to the measurement target optical fiber 21 through the dummy fiber 14 and the connection between the connection port 15 and the connector 22. Backscattered light generated in the measurement target optical fiber 21 is branched by the coupler 13 and is received by the APD 16.

The APD 16 converts the backscattered light into an electric signal corresponding to optical power. The receiving circuit 17 amplifies an analog signal output from the APD 16 and converts the analog signal into a digital signal. The CPU generates an OTDR waveform indicating a backscattered light level with respect to the distance from the optical time domain reflectometer 101, using the digital signal from the receiving circuit 17. The display unit 19 displays the OTDR waveform.

Figure 2:
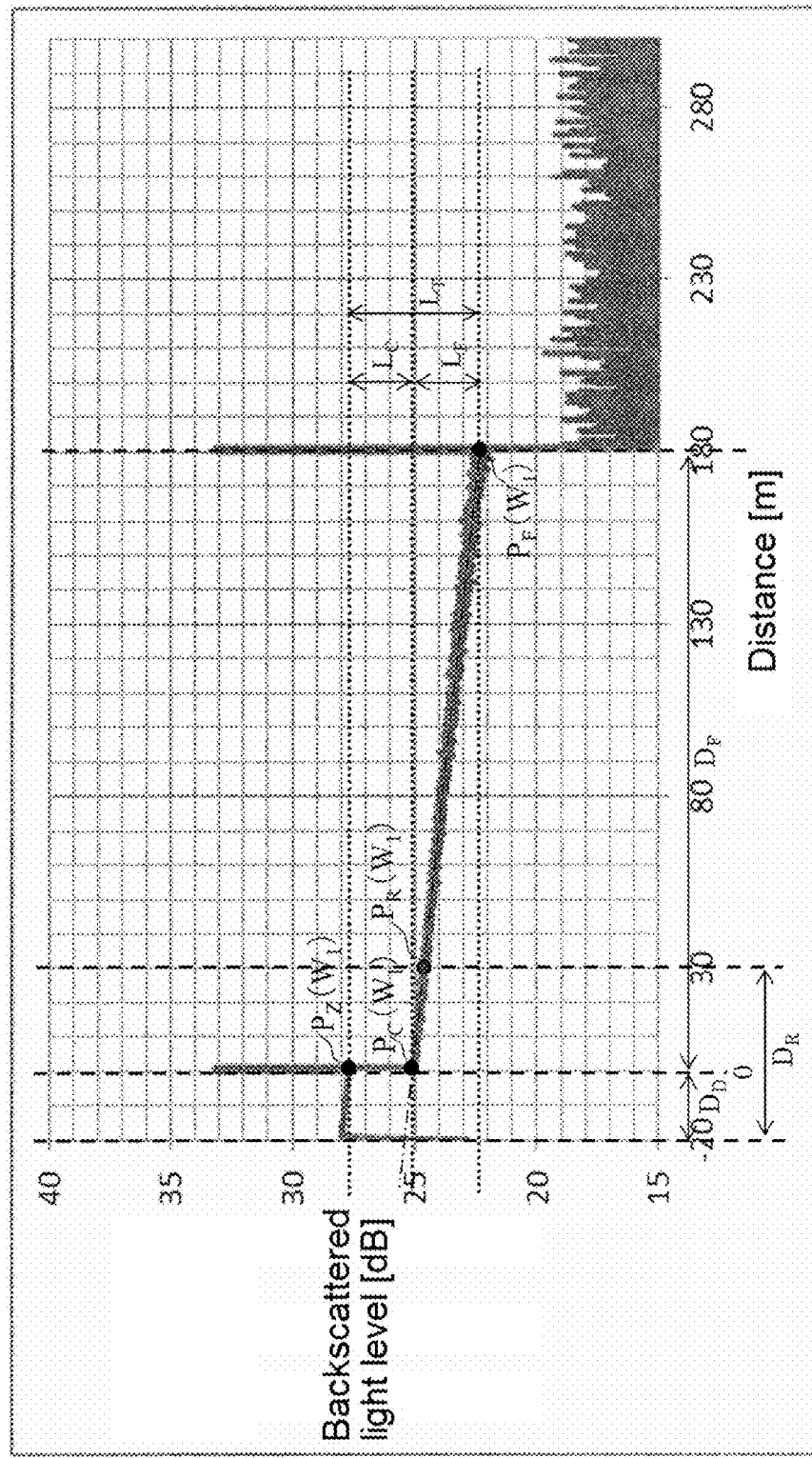
FIG. 2 illustrates a first example of an OTDR waveform.

FIG. 2 illustrates a first example of the OTDR waveform. The first example of the OTDR waveform shows a case in which the pulse width $W_1$ of the optical pulse is short with respect to the dummy fiber 14 and causes no problem in terms of spatial resolution. In the first example of the OTDR waveform, it is possible to detect a backscattered light level $P_Z(W_1)$ at an emission end of the port 15 and a backscattered light level $P_C(W_1)$ at an incident end of the connector 22 at a distance $D_D$ at which the connection port 15 and the connector 22 are disposed and a backscattered light level $P_F(W_1)$ at a distance $D_F$ at which a far end of the measurement target optical fiber 21 is disposed. In this embodiment, the distance $D_D$ at which the connection port 15 and the connector 22 are disposed is represented by "0".

A difference between the backscattered light levels $P_Z(W_1)$ and $P_C(W_1)$ indicates a connection loss $L_C$ at the connection port 15 and the connector 22 and a difference between the backscattered light levels $P_C(W_1)$ and $P_F(W_1)$ indicates a transmission loss $L_F$ in the measurement target optical fiber 21. Therefore, in the first example of the OTDR waveform, it is possible to measure a total loss $L_T$ including loss in the connector 22.

Figure 3:
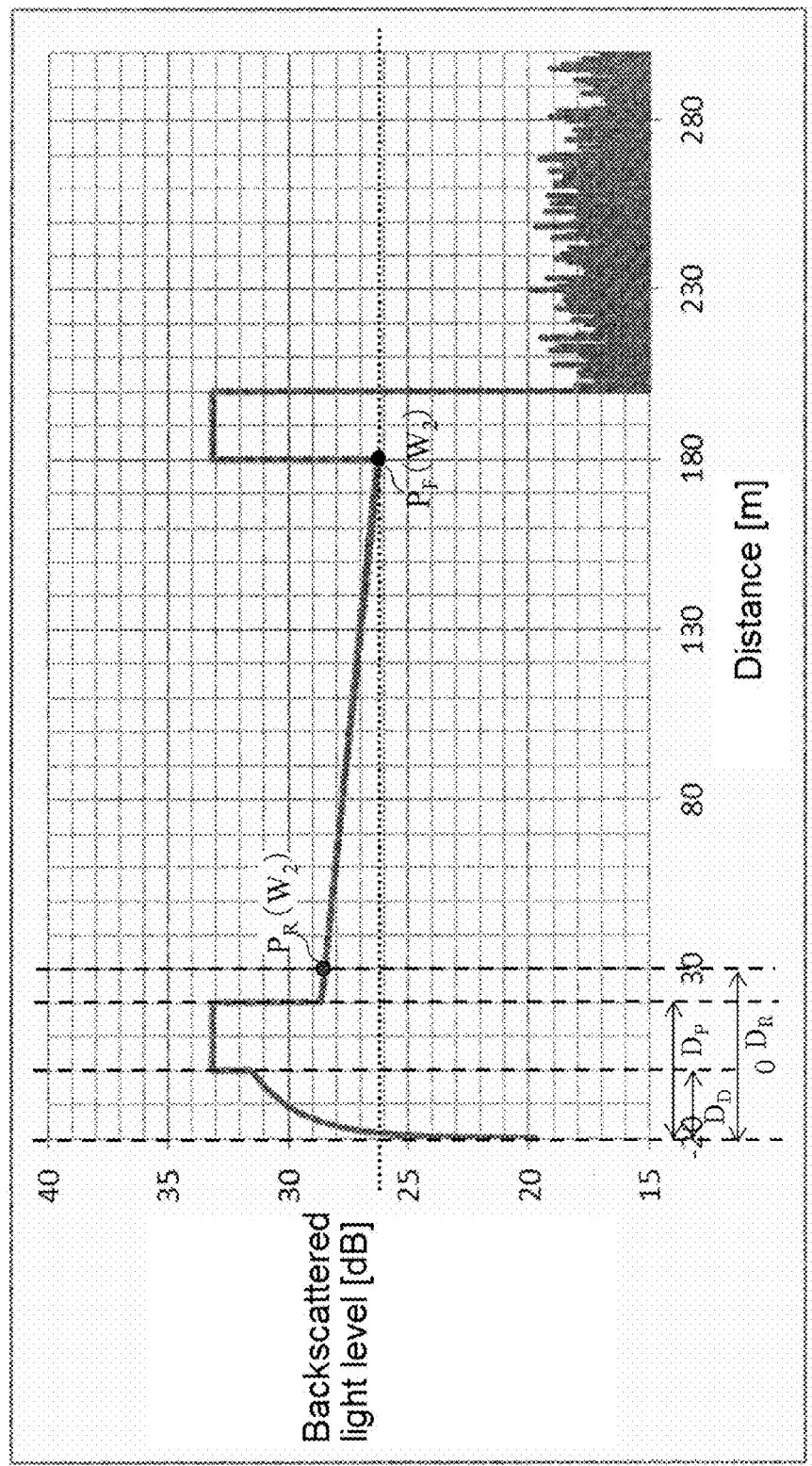
FIG. 3 illustrates a second example of the OTDR waveform.

FIG. 3 illustrates a second example of the OTDR waveform. The second example of the OTDR waveform shows a case in which the pulse width $W_2$ of the optical pulse is long with respect to the dummy fiber 14 and causes a problem in terms of spatial resolution. In the second example of the OTDR waveform, it is possible to detect a backscattered light level $P_F(W_2)$, but it is difficult to detect a backscattered light level at the distance $D_D$. Therefore, it is difficult to measure the connection loss $L_C$ and the transmission loss $L_F$. As a result, it is difficult to measure the total loss $L_T$.

The connection loss $L_C$ at the connection port 15 and the connector 22 is unlikely to change as long as the connection state between the connection port 15 and the connector 22 does not change even in a case in which the pulse width of the optical pulse changes. Therefore, in the present disclosure, before the shipment of the device according to the present disclosure, OTDR waveforms at k types of pulse widths $W_i$ (i=1, 2, . . . , K) which are preset in the optical time domain reflectometer are measured in advance in a state in which a temporary optical fiber corresponding to the measurement target optical fiber 21 is connected and a predetermined measurement value derived from each of the measured OTDR waveforms is stored as a reference value in the storage unit 20. It is assumed that the length of the temporary optical fiber is equal to or greater than a distance $D_R$ (which will be described below).

In this case, among the pulse widths $W_i$, a pulse width of the optical pulse which is short with respect to the dummy fiber 14 and causes no problem in terms of spatial resolution as illustrated in FIG. 2 (having a dead zone equal to or shorter than the time corresponding to the length of the dummy fiber 14) is used as a first pulse width $W_1$. Then, among the pulse widths $W_i$, a pulse width of the optical pulse which is long with respect to the dummy fiber 14 as illustrated in FIG. 3 is used as a second pulse width $W_2$.

In the present disclosure, since the total loss $L_T$ is calculated with reference to the stored measurement value, it is possible to omit measurement using a plurality of pulse widths according to the related art. In addition, for example, the measurement value may be stored at the time of factory shipment or at the time of the first connection of the connector 22 to the connection port 15.

Figure 4:
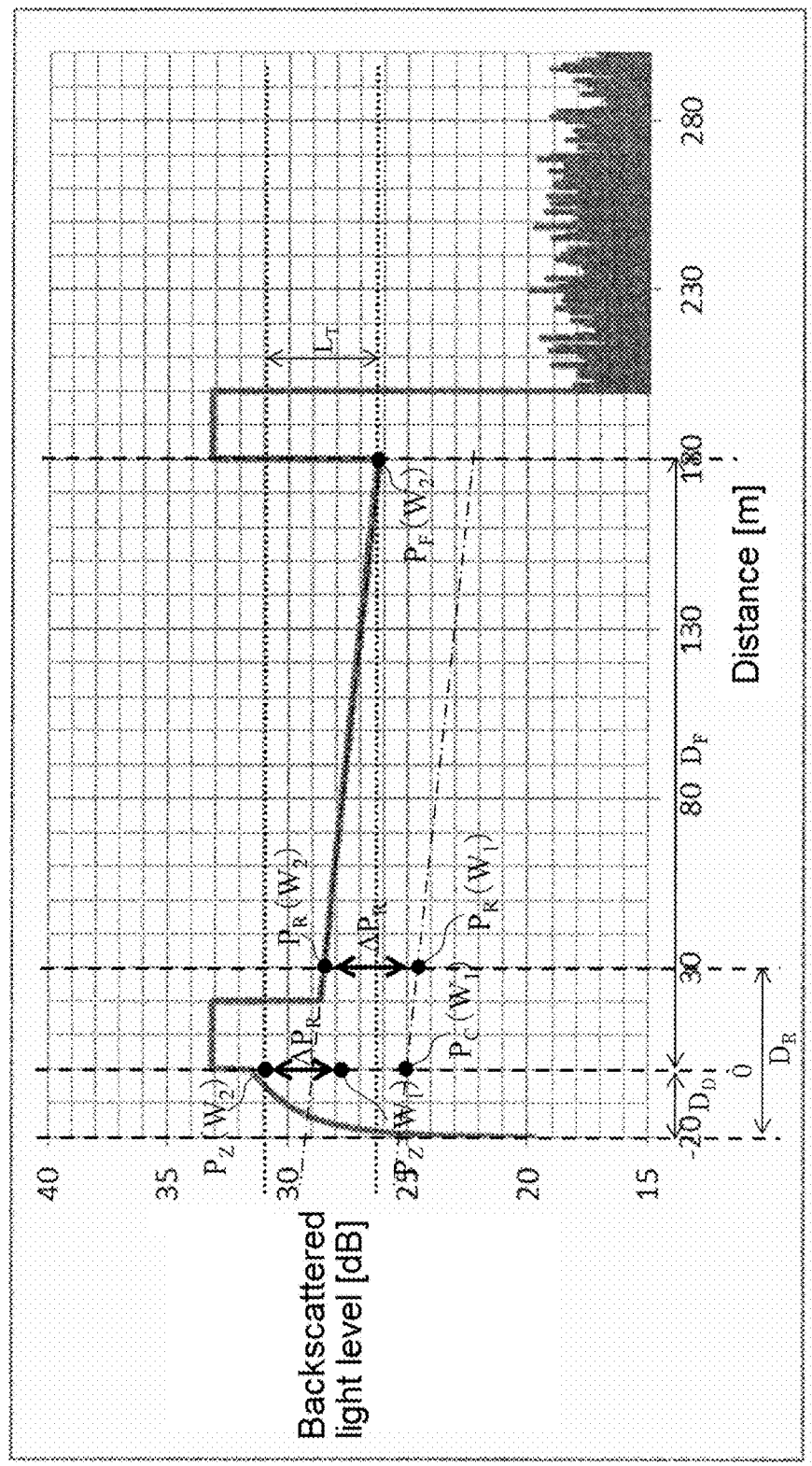
FIG. 4 is a diagram illustrating a total loss measurement method according to an embodiment.

In this embodiment, a difference $\Delta P_R$ between the backscattered light levels $P_R(W_2)$ and $P_R(W_1)$ at the reference distance $D_R$ and the backscattered light level $P_Z(W_1)$ at the distance $D_D$ which is illustrated in FIG. 4 is used as the measurement value stored in the storage unit 20.

FIG. 4 illustrates an example of the values referred to in this embodiment. In this embodiment, for each of the pulse widths $W_i$ preset in the optical time domain reflectometer, the backscattered light level $P_R(W_i)$ at a predetermined reference distance $D_R$ is measured. Then, each difference $\Delta P_R$ between the backscattered light level $P_R(W_1)$ corresponding to the pulse width $W_1$ and the backscattered light level $P_R(W_2)$ corresponding to the pulse width $W_2$ is calculated from predetermined backscattered light levels among the backscattered light levels $P_R(W_i)$. Then, the difference $\Delta P_R$ is stored in the storage unit 20 so as to be associated with the pulse width $W_i$. In addition, the backscattered light level $P_Z(W_1)$ corresponding to the pulse width $W_1$ at the distance $D_D$ is stored in the storage unit 20. Here, the backscattered light level $P_R(W_1)$ is referred to as a second backscattered light level $P_R(W_1)$ and the backscattered light level $P_R(W_2)$ is referred to as a third backscattered light level $P_R(W_2)$. In addition, the backscattered light level $P_Z(W_1)$ is referred to as a first backscattered light level $P_Z(W_1)$.

Here, the reference distance $D_R$ is longer than the distance $D_P$ and is shorter than a distance at which an event, such as reflection, occurs. The distance $D_P$ is a distance at which the reflection of the optical pulse with the pulse width $W_2$ occurring at the incident end of the connector 22 disappears. It is preferable that the reference distance $D_R$ is longer than the fiber length obtained by applying the maximum value of the pulse width of the optical pulse to Expression (1) and is several times longer than the pulse width. It is preferable that the difference $\Delta P_R$ is an average value in a predetermined range from the reference distance $D_R$.

A method for measuring the total loss $L_T$ in the optical time domain reflectometer 101 after a product is shipped will be described with reference to FIG. 4. In a case in which the optical time domain reflectometer 101 according to this embodiment measures the total loss $L_T$, the CPU 18 performs the following steps.

Step S101: the CPU 18 instructs the LD control unit 12 of the pulse width of the optical pulse output from the LD 11. Then, the LD control unit 12 sets the pulse width of the optical pulse output from the LD 11. The optical pulse with the pulse width is emitted from the LD 11 and the backscattered light of the optical pulse is received by the APD 16. In this case, the pulse width $W_i$ is a pulse width corresponding to the length or loss of the measurement target optical fiber 21 and corresponds to the second pulse width $W_2$ as the pulse width of the optical pulse which is long with respect to the dummy fiber 14.

Step S102: the CPU 18 detects the backscattered light level $P_F(W_2)$ at the distance $D_F$ from the output signal of the APD 16.

Step S103: the CPU 18 reads the difference (the difference at the same pulse width $W_i$) $\Delta P_R$ corresponding to the pulse width $W_2$ set in Step S101 and the backscattered light level $P_Z(W_1)$ from the storage unit 20 and adds the difference $\Delta P_R$ to the backscattered light level $P_Z(W_1)$ to calculate the backscattered light level $P_Z(W_2)$.

Step S104: the CPU 18 calculates the difference between the backscattered light level $P_Z(W_2)$ and the backscattered light level $P_F(W_2)$. In this way, the total loss $L_T$ is calculated.

Step S103 may be performed at any timing after Step S101 and before Step S104.

Here, any method may be used to set the pulse width in Step S101. For example, the CPU 18 may acquire the length of the measurement target optical fiber 21 and determine a pulse width corresponding to the length of the measurement target optical fiber 21. The user of the optical time domain reflectometer 101 may input a pulse width with an input unit (not illustrated) and the CPU 18 may set the input pulse width in the LD control unit 12.

In a case in which there is no change in the connection state of the connection port 15 and the connector 22, the connection loss $L_C$ at the connection port 15 and the connector 22 at the distance $D_D$ does not change even though the pulse width changes. For this reason, the backscattered light level $P_Z(W_2)$ before the connection loss $L_C$ at the connection port 15 and the connector 22 at the distance $D_D$ is equal to a value obtained by adding the difference $\Delta P_R$ to the backscattered light level $P_Z(W_1)$. Therefore, the difference $\Delta P_R$ is added to the backscattered light level $P_Z(W_1)$ to calculate the backscattered light level $P_Z(W_2)$ before the connection loss $L_C$ at the connection port 15 and the connector 22 at the distance $D_D$. Here, the backscattered light level $P_Z(W_2)$ is also referred to as a fourth backscattered light level $P_Z(W_2)$.

In the OTDR measurement of the measurement target optical fiber 21, for example, in a case in which the difference $\Delta P_R$ at a pulse width $W_2$ of 200 ns with respect to a pulse width $W_1$ of 10 ns is 6.5 dB and the backscattered light level $P_Z(W_1)$ is 25 dB, the backscattered light level $P_Z(W_2)$ calculated in Step S103 is as follows: $P_Z(W_2)=P_Z(W_1)+\Delta P_R=25+6.5=31.5$ (dB).

As described above, the optical time domain reflectometer 101 according to this embodiment calculates the total loss $L_T$ including the connection loss $L_C$ at the connection port 15 and the connector 22, using the difference $\Delta P_R$ and the backscattered light level $P_Z(W_1)$ stored in the storage unit 20. Therefore, in this embodiment, even in a case in which the length of the dummy fiber is so short that it is not distinguished from the pulse width output to the measurement target optical fiber 21 in terms of spatial resolution, it is possible to measure the total loss including loss at the connection port of the measurement target optical fiber, without performing measurement using a plurality of pulse widths.

The value stored so as to be associated with the pulse width $W_i$ may be the backscattered light level $P_Z(W_2)$ instead of the difference $\Delta P_R$. As such, in this embodiment, it is possible to store any value capable of deriving the backscattered light level $PR(W_2)$.

The connection loss $L_C$ at the connection port 15 and the connector 22 may be large, for example, in a case in which the connection between the connection port 15 and the connector 22 is loose or in a case in which the measurement target optical fiber 21 in the vicinity of the connector 22 is bent. The backscattered light level $P_R(W_2)$ at the reference distance $D_R$ can be predicted according to the power of the optical pulse. Therefore, in this embodiment, it is preferable that a table in which the predicted range of the backscattered light level at the reference distance $D_R$ and the pulse width of the optical pulse are associated with each other is stored in the storage unit 20 in order to detect connection abnormality. In this case, in Step S102, the CPU 18 determines whether the backscattered light level $P_R(W_2)$ is out of the predicted range (connection abnormality detection step) to detect the connection abnormality at the connection port 15 and the connector 22.

As such, in this embodiment, it is possible to detect the connection abnormality at the connection port 15 and the connector 22 while starting OTDR measurement at a pulse width corresponding to the length of the measurement target optical fiber 21. In a case in which the CPU 18 detects the connection abnormality at the connection port 15 and the connector 22 in Step S102, it is preferable that the CPU 18 display a notification indicating that the abnormality has been detected on the display unit 19. In this case, the CPU 18 may stop the steps after Step S103.

INDUSTRIAL APPLICABILITY

The present disclosure can be applied to information communication industries.

DESCRIPTION OF REFERENCE NUMERALS AND SIGNS

11: LD
12: LD control unit
13: coupler
14: dummy fiber
15: connection port
16: APD
17: receiving circuit
18: CPU
19: display unit
20: storage unit
21: measurement target optical fiber
22: connector
101: optical time domain reflectometer

What is claimed is:

1. An optical time domain reflectometer comprising:
   a pulse width setting unit that sets a pulse width of an optical pulse;
   a light source that generates an optical pulse with the pulse width set by the pulse width setting unit;
   an optical receiver that detects a backscattered light level obtained by scattering of the optical pulse output from the light source in a measurement target optical fiber;
   a storage unit that stores in advance a fourth backscattered light level ($P_Z(W_2)$) obtained by adding a difference ($\Delta P_R$) between a second backscattered light level ($P_R(W_1)$) at a predetermined reference distance ($D_R$) which is measured using a predetermined first pulse width ($W_1$) and a third backscattered light level ($P_R(W_2)$) at the predetermined reference distance ($D_R$) which is measured using a second pulse width ($W_2$) larger than the first pulse width to a first backscattered light level ($P_Z(W_1)$) at a connection point ($D_D$) to the measurement target optical fiber to be connected which is measured using the first pulse width so as to be associated with the second pulse width before a test; and
   an arithmetic processing unit that reads the fourth backscattered light level ($P_Z(W_2)$) at the second pulse width corresponding to a pulse width of an optical pulse output from the light source to the measurement target optical fiber for the test from the storage unit and calculates a transmission loss ($L_T$) in the measurement target optical fiber using the fourth backscattered light level ($P_Z(W_2)$).

2. The optical time domain reflectometer according to claim 1,
   wherein the storage unit stores in advance the difference ($\Delta P_R$) and the first backscattered light level ($P_Z(W_1)$) so as to be associated with the second pulse width before the test, instead of the fourth backscattered light level ($P_Z(W_2)$), and
   the arithmetic processing unit reads the difference ($\Delta P_R$) and the first backscattered light level ($P_Z(W_2)$) from the storage unit, adds the difference ($\Delta P_R$) and the first backscattered light level ($P_Z(W_1)$), and calculates the transmission loss ($L_T$) in the measurement target optical fiber using the calculated fourth backscattered light level ($P_Z(W_2)$), instead of reading the fourth backscattered light level ($P_Z(W_2)$) from the storage unit and calculating the transmission loss ($L_T$) in the measurement target optical fiber.

3. The optical time domain reflectometer according to claim 2,
wherein the storage unit further stores a predicted range of a backscattered light level at the reference distance, and
the arithmetic processing unit determines whether or not a backscattered light level at the reference distance detected by the optical receiver is out of the predicted range to further detect connection abnormality at the connection point to the measurement target optical fiber.

4. The optical time domain reflectometer according to claim 1,
wherein the storage unit further stores a predicted range of a backscattered light level at the reference distance, and
the arithmetic processing unit determines whether or not a backscattered light level at the reference distance detected by the optical receiver is out of the predicted range to further detect connection abnormality at the connection point to the measurement target optical fiber.

5. A testing method of an optical time domain reflectometer, the method comprising:
a storage step of storing in advance a fourth backscattered light level ($P_Z(W_2)$) obtained by adding a difference ($\Delta P_R$) between a second backscattered light level ($P_R(W_1)$) at a predetermined reference distance ($D_R$) which is measured using a predetermined first pulse width ($W_1$) and a third backscattered light level ($P_R(W_2)$) at the predetermined reference distance ($D_R$) which is measured using a second pulse width ($W_2$) larger than the first pulse width to a first backscattered light level ($P_Z(W_1)$) at a connection point ($D_D$) to a measurement target optical fiber to be connected which is measured using the first pulse width so as to be associated with the second pulse width before a test;
an optical pulse detection step of generating an optical pulse with a predetermined pulse width for a test, outputting the optical pulse to the measurement target optical fiber, and detecting a backscattered light level of the optical pulse scattered in the measurement target optical fiber; and
a transmission loss derivation step of reading the fourth backscattered light level ($P_Z(W_2)$) at the second pulse width corresponding to the predetermined pulse width and calculating a transmission loss ($L_T$) in the measurement target optical fiber using the fourth backscattered light level ($P_Z(W_2)$).

6. The testing method of an optical time domain reflectometer according to claim 5,
wherein, in the storage step, the difference ($\Delta P_R$) and the first backscattered light level ($P_Z(W_1)$) are stored in advance so as to be associated with the third pulse width before the test, instead of the fourth backscattered light level ($P_Z(W_2)$), and
in the transmission loss derivation step, the difference ($\Delta P_R$) and the first backscattered light level ($P_Z(W_1)$) are read and added and the transmission loss ($L_T$) in the measurement target optical fiber is calculated using the calculated fourth backscattered light level ($P_Z(W_2)$), instead of reading the fourth backscattered light level ($P_Z(W_2)$) and calculating the transmission loss ($L_T$) in the measurement target optical fiber.

* * * * *